United States Patent [19]

Nishikawa

[11] Patent Number: 4,623,053

[45] Date of Patent: Nov. 18, 1986

[54] CONTROL DEVICE FOR A DIRECT-COUPLING HYDRAULIC CLUTCH IN A HYDRAULIC TORQUE CONVERTER

[75] Inventor: Masao Nishikawa, Tokyo, Japan

[73] Assignee: Honda Giken Kogyo K.K., Tokyo, Japan

[21] Appl. No.: 651,793

[22] Filed: Sep. 18, 1984

[30] Foreign Application Priority Data

Sep. 21, 1983 [JP] Japan .................. 58-174678

[51] Int. Cl.[4] .......................................... F16D 43/24
[52] U.S. Cl. ................................ 192/0.033; 192/3.31
[58] Field of Search ............... 192/0.032, 0.033, 0.075, 192/0.076, 3.31, 103 R; 74/645, 732, 733

[56] References Cited

U.S. PATENT DOCUMENTS

| | | | |
|---|---|---|---|
| 2,728,427 | 12/1955 | Lucia | 192/0.033 |
| 4,448,293 | 5/1984 | Maeda | 192/3.31 |
| 4,468,988 | 9/1984 | Hiramatsu | 74/868 |
| 4,501,175 | 2/1985 | Tatsumi | 74/869 |
| 4,507,985 | 4/1985 | Morimoto et al. | 192/3.31 |
| 4,510,747 | 4/1985 | Yoshida | 74/732 X |
| 4,535,652 | 8/1985 | Nishikawa et al. | 192/3.58 X |

FOREIGN PATENT DOCUMENTS 151662 8/1984 Japan .

*Primary Examiner*—George H. Krizmanich
*Attorney, Agent, or Firm*—Arthur L. Lessler

[57] ABSTRACT

A control device for a hydraulic direct-coupling clutch of a hydraulic torque converter installed in an automotive vehicle, which is adapted to control the supply of operating fluid to the direct-coupling clutch by means of an electrically actuatable selector valve. Pilot fluid pressure generated by a pilot fluid pressure source acts upon one end face of a valve body of the selector valve to bias the valve body to a position for supplying the operating fluid to the direct-coupling clutch. A drain line communicates a pressure chamber of the selector valve defined by the one end face of the valve body with a zone under a low pressure, and an electromagnetic valve is arranged across the drain line, which is adapted to open the drain line when energized, to permit the pilot fluid pressure in the pressure chamber to escape to the zone under a lower pressure. An electrical circuit supplies the electromagnetic valve with electric power at least dependent upon the speed of the automotive vehicle, for energizing the valve. Signal pressure generating means generates signal fluid pressure dependent upon the speed of the automotive vehicle. Fluid pressure regulating means regulates the magnitude of pressure of the operating fluid in response to the signal fluid pressure generated by the signal pressure generating means. Preferably, when the vehicle speed is lower than a predetermined value, the fluid pressure regulating means regulates the operating fluid pressure to values smaller than a value at which the direct-coupling clutch is rendered inoperative, whereby the direct-coupling clutch is rendered inoperative irrespective of the operative state of the electromagnetic valve.

4 Claims, 6 Drawing Figures

| FIG.2A | FIG.2B |
|---|---|

CONTROL DEVICE FOR A DIRECT-COUPLING HYDRAULIC CLUTCH IN A HYDRAULIC TORQUE CONVERTER

BACKGROUND OF THE INVENTION

This invention relates to a control device for a direct-coupling hydraulic clutch provided in a hydraulic torque converter of an automotive vehicle, and more particularly to a control device of the type employing an electromagnetic valve as a pilot valve and adapted to selectively render the direct-coupling hydraulic clutch operative or inoperative by means of the electromagnetic valve.

An automotive vehicle equipped with a hydraulic torque converter can provide a smooth driving characteristic with its speed reduction ratio smoothly changeable, but is inferior to one equipped with a manual transmission in the fuel consumption of the engine due to slippage inherent in the hydraulic torque converter. To eliminate this disadvantage, it has been proposed to mechanically lock up the torque converter to reduce the slip loss to a minimum required value when the amplification of torque performed by the torque converter is almost not available.

Further, a method of controlling a direct-coupling hydraulic clutch in a torque converter has been proposed, e.g. by Japanese Patent Application No. 58-25064 assigned to the assignee of the present application, which is adapted to mechanically lock up the torque converter in a manner increasing the engaging force of the direct-coupling clutch by locking up the torque converter in proportion to an increase in the vehicle speed, instead of fully locking up same, while allowing slippage in the torque converter in a low vehicle speed region, to thereby absorb vibrations of the engine, and at the same time to maintain the torque amplifying function of the torque converter.

In a direct-coupling clutch of the type employing an electromagnetic valve for effecting or interrupting mechanical locking-up of the torque converter, if the electromagnetic valve is used as a pilot valve and at the same time part of the operating fluid for actuating the direct-coupling clutch is used as pilot pressure fluid, it will be necessary to drain part of the pilot operating fluid either during the engagement of the direct-coupling clutch to lock up the torque converter or during disengagement of the same clutch. If the pilot operating fluid is permitted to drain during actuation of the direct-coupling clutch, the hydraulic system concerned has to be designed so as to compensate for a drop in the line pressure, which can thus occur during running of the vehicle. Besides, it will be necessary to design the electromagnetic valve so as to fully withstand a great deal of heat generated by itself due to its very long energization period. As a result, the electromagnetic valve will inevitably be large in size. Further, a hydraulic pump with a large capacity is required in the hydraulic system to compensate for drainage of the operating fluid during running of the vehicle, which leads to increased consumption of the electric power, thus being impractical. On the other hand, if part of the pilot operating fluid is permitted to drain during interruption of the locking-up of the torque converter, the direct-coupling clutch can wrongly be actuated to lock up the torque converter when a disconnection occurs in the electromagnetic valve per se or its wiring system, causing engine stall upon stoppage of the vehicle.

Since engine stall due to disconnection of the electromagnetic valve should be avoided first of all, conventionally it has been generally employed to permit part of the operating fluid to drain during locking-up of the torque converter, by employing a hydraulic pump with a large capacity in the hydraulic system.

SUMMARY OF THE INVENTION

It is an object of the invention to provide a control device for a direct-coupling hydraulic clutch of a hydraulic torque converter, which is adapted to permit drainage of the pilot operating fluid during interruption of the locking-up of the torque converter to thereby permit the use of a hydraulic pump with a small capacity, as well as to prolong the effective life of the electromagnetic valve, allowing the valve to be compact in size due to its small energizing time for the running time of the vehicle.

It is another object of the invention to provide a control device for a direct-coupling hydraulic clutch of a hydraulic torque converter, which is adapted to avoid engine stall even in the event of a trouble such as a disconnection in the electromagnetic valve as a pilot valve, or in its wiring system.

The invention provides a control device for a hydraulic direct-coupling clutch of a hydraulic torque converter for use in an automotive vehicle, wherein the hydraulic direct-coupling clutch is arranged between input and output members of the torque converter and is operable to mechanically engage them with each other. The control device has a selector valve electrically actuatable for controlling the supply of operating fluid to the direct-coupling clutch. The selector valve has a valve body and a pressure chamber defined by one end face of the valve body. Pilot fluid pressure generated by a pilot fluid pressure source is supplied to the pressure chamber to act upon the one end face of the valve body to bias the valve body to a position for supplying the operating fluid to the direct-coupling clutch. A drain line communicates the pressure chamber of the selector valve with a zone under a lower pressure. An electromagnetic valve is arranged across the drain line to open the drain line when energized, to permit the pilot fluid pressure in the pressure chamber to escape to the zone under a lower pressure. An electrical circuit supplies the electromagnetic valve with electric power at least dependent upon the speed of the automotive vehicle, for energizing the valve. Signal pressure generating means generates signal fluid pressure dependent upon the speed of the automotive vehicle. Fluid pressure regulating means regulates the magnitude of pressure of the operating fluid in response to the signal fluid pressure generated by the signal pressure generating means. Preferably, when the vehicle speed is lower than a predetermined value, the fluid pressure regulating means regulates the pressure of the operating fluid to values smaller than a value at which the direct-coupling clutch is rendered inoperative, whereby the direct-coupling clutch is rendered inoperative irrespective of the operative state of the electromagnetic valve.

The control device of the invention includes an operating fluid source for supplying the operating fluid, and an operating fluid line connecting the operating fluid source to the direct-coupling clutch by way of the selector valve. The fluid pressure regulating means is preferably arranged in the operating fluid line at a location between the operating fluid source and the selector valve, and the pilot fluid pressure of the pilot fluid pressure source is fluid pressure generated by the fluid pressure regulating means.

Still preferably, the fluid pressure regulating means is adapted to increase the pressure of the operating fluid in proportion to an increase in the vehicle speed.

Further preferably, the control device of the invention includes a pilot fluid line branching off from the operating fluid line at a location between the selector valve and the fluid pressure regulating means and communicating with the pressure chamber of the selector valve, and restriction means arranged across the pilot fluid line.

The above and other objects, features and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
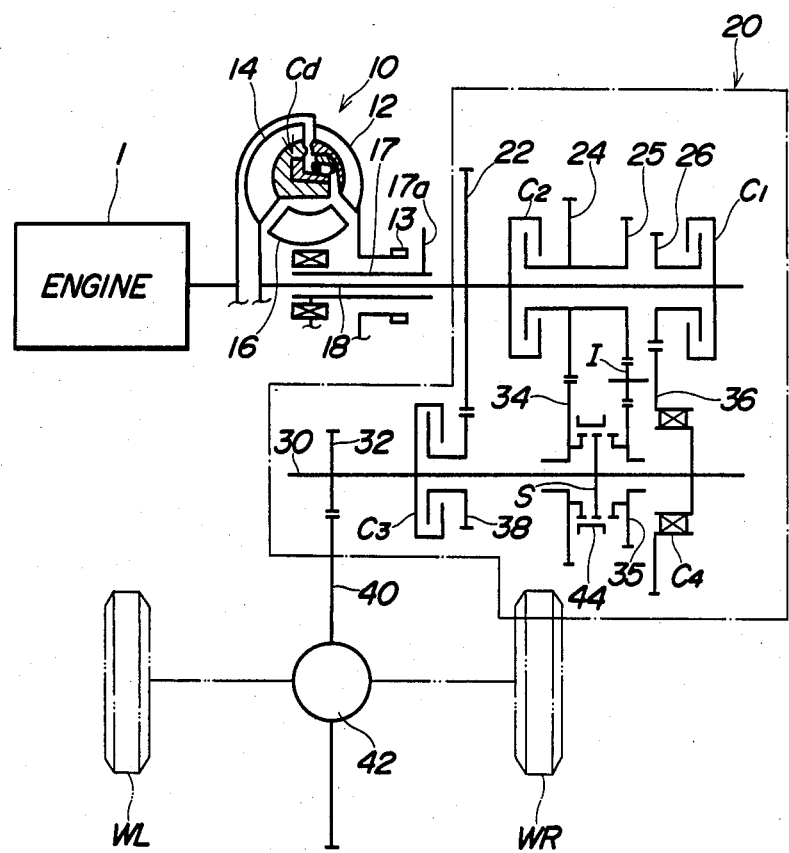
FIG. 1 is a schematic view of an automatic transmission for automotive vehicles, to which the control device for a direct-coupling clutch according to the invention is applied.

FIG. 1 schematically illustrates an automatic transmission for automotive vehicles, to which the invention is applied. Output from an engine 1 is first transmitted to a pump 12 of a hydraulic torque converter (hereinafter merely called "the torque converter") 10, and then to a turbine 14 in a hydrodynamic manner. When amplification of torque takes place within the torque converter 10 due to a difference in the rotational speed between the pump 12 and the turbine 14, the resulting reaction force is borne by a stator 16. A gear 13 is mounted on the pump 12 for driving an oil hydraulic pump 50 appearing in FIG. 2. When the reaction force acting upon the stator 16 exceeds a predetermined value, a stator shaft 17 rotates to urge a regulator valve 51 appearing in FIG. 2 with an arm 17a provided at one end of the stator shaft 17, to thereby increase fluid line pressure, i.e. discharge pressure of the hydraulic pump 50, as hereinafter described in detail.

Figure 2A:
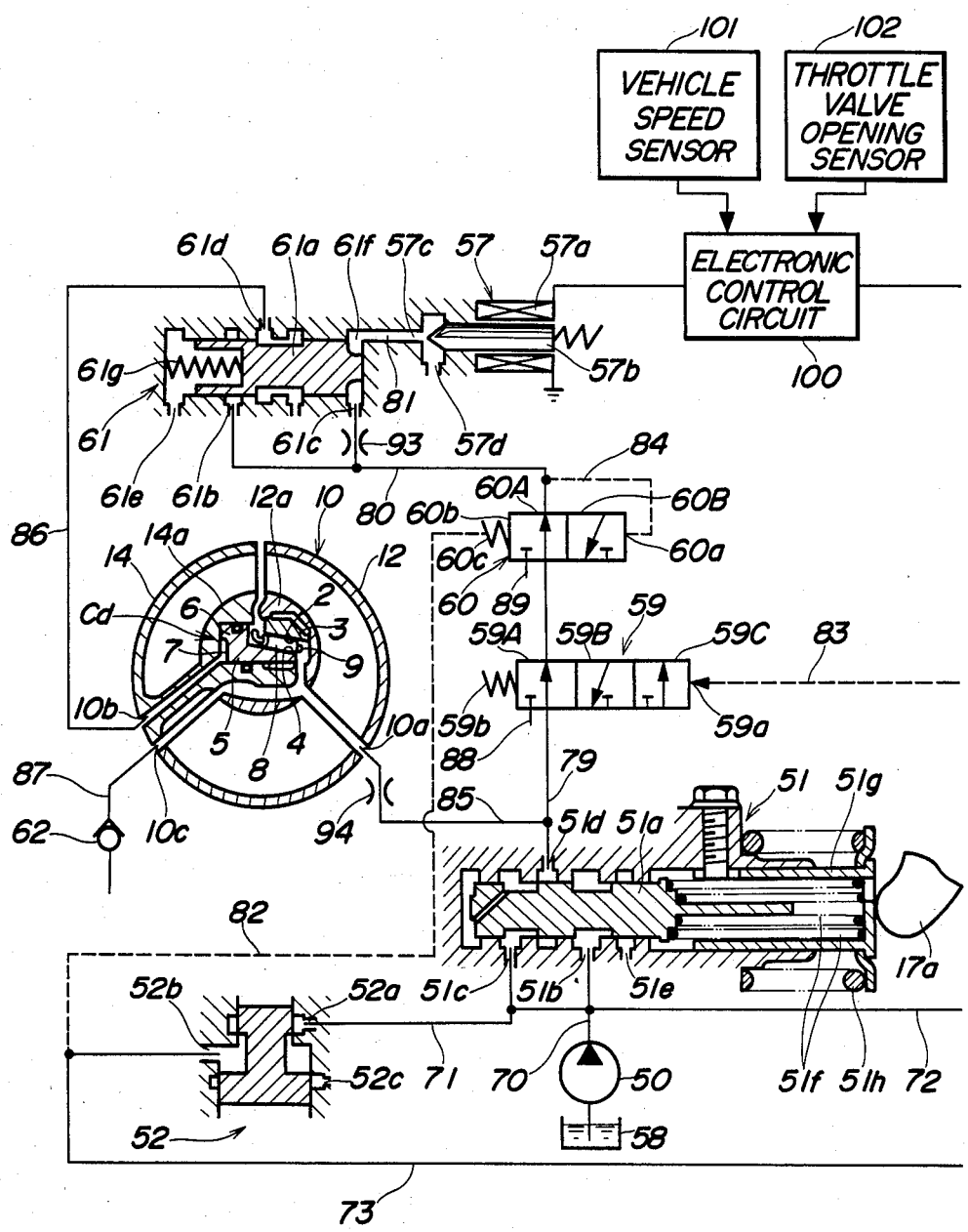
FIGS. 2A and 2B comprise a circuit diagram illustrating a hydraulic control system employed in the automatic transmission shown in FIG. 1, in which is incorporated the direct-coupling clutch control device according to one embodiment of the invention.
Figure 2:
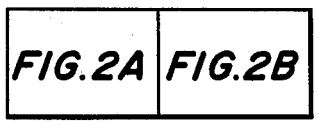
FIG. 2 shows the relationship between FIGS. 2A AND 2B.
Figure 2B:
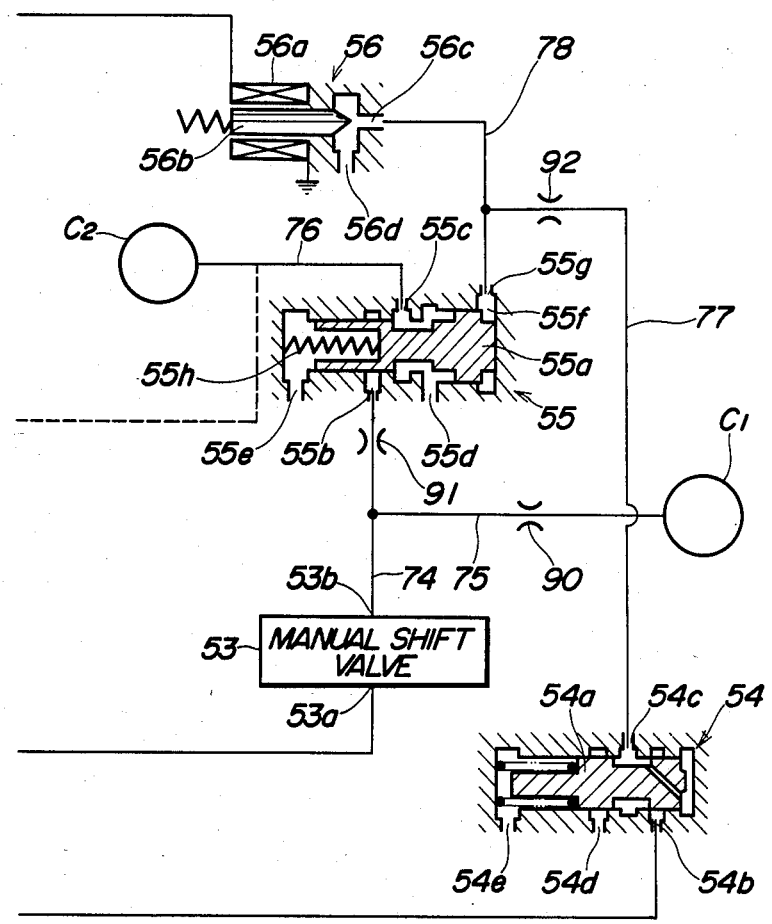

A direct-coupling clutch Cd is interposed between the pump 12 and the turbine 14 of the torque converter 10, which is, as shown in FIG. 2 in greater detail, constructed as follows: An annular driving member 3 having a driving conical surface 2 at its inner periphery is secured to an inner peripheral wall 12a of the pump 12, while an annular driven member 5, which has a driven conical surface 4 at its outer periphery extending parallel with the driving conical surface 2, is slidably spline-fitted in an inner peripheral wall 14a of the turbine 14 for axial movement relative thereto. The driven member 5 has its one end formed integrally with a piston 6 which is slidably received within an oil hydraulic cylinder 7 formed in the inner peripheral wall 14a of the turbine 14. The piston 6 receives a pressure in the cylinder 7 and a pressure in the torque converter 10 at the same time, at its both or left and right end faces, respectively.

Cylindrical clutch rollers 8 are interposed between the driving and driven conical surfaces 2, 4 and retained in place by an annular retainer 9 in a manner such that the clutch rollers 8 each have its axis inclined by a predetermined angle relative to the generating line of a virtual conical surface which extends between the conical surfaces 2, 4 along the middle thereof. When the torque converter 10 is not required to amplify the torque transmitted thereto, an oil pressure which is higher than the internal pressure of the torque converter 10 is supplied to the cylinder 7 to cause the piston 6, i.e. the driven member 5, to move toward the driving member 3, whereby the clutch rollers 8 are urgedly held between the conical surfaces 2, 4. With the clutch rollers 8 thus urgedly held between the conical surfaces 2, 4, if output torque from the engine 1 acts on the driving member 3 to cause same to drive the driven member 5, that is, if a load is applied on the torque converter 10, the clutch rollers 8 rotate about their own axes to provide relative axial displacement of the members 3, 5 in a direction such that the members 3, 5 approach toward each other. Consequently, the clutch rollers 8 bitingly engage with the conical surfaces 2, 4 to establish a mechanical coupling between the members 3, 5, i.e. between the pump 12 and the turbine 14.

Even on this occasion, if engine output torque exceeding the coupling force of the direct-coupling clutch Cd is applied between the pump 12 and the turbine 14, the clutch rollers 8 can slip on the conical surfaces 2, 4 to divide the engine output torque into two parts, wherein part of the torque is mechanically transmitted through the direct-coupling clutch Cd while the remaining torque is hydrodynamically transmitted from the pump 12 to the turbine 14. Therefore, the ratio between the mechanically transmitted torque and the hydrodynamically transmitted torque is variable dependent on the degree of slipping of the clutch rollers 8.

On the other hand, if a reverse load is applied to the torque converter 10 during operation of the direct-coupling clutch Cd, the rotational speed of the driven member 5 becomes larger than that of the driving member 3. Consequently, the clutch rollers 8 now rotate in a direction reverse to that mentioned above, to cause relative axial displacement of the members 3, 5 in a direction of moving the members 3, 5 away from each other. In this manner, the clutch rollers 8 are released from biting engagement with the conical surfaces 2, 4 to run idle so that the reverse load is transmitted from the turbine 14 to the pump 12 only in a hydrodynamic manner.

As the cylinder 7 is released from the hydraulic pressure, the piston 6 is displaced to its initial position by the internal pressure of the torque converter 10 acting thereupon, thereby rendering the direct-coupling clutch Cd inoperative.

Reverting to FIG. 1, the torque converter 10 has an output shaft 18 also serving as an input shaft of an auxiliary transmission 20. Mounted on the output shaft 18, i.e. the input shaft of the auxiliary transmission 20, are a third-speed driving gear 22, a second-speed clutch C2, and a first-speed clutch C1, which arranged in the order mentioned from left to right in the figure. Freely fitted on the input shaft 18 are a second-speed driving gear 24 and a first-speed driving gear 26 which are disposed to rotate in unison with the input shaft 18 when the clutches C2 and C1 become engaged, respectively. A reverse driving gear 25 is formed integrally with the second-speed driving gear 24.

A countershaft 30 extends parallel with the input shaft 18 and is provided with a final driving gear 32, a third-speed clutch C3, a spline S selectively engageable with a second-speed driven gear 34 or with a reverse driven gear 35, and a first-speed driven gear 36, which are arranged in the order mentioned from left to right in FIG. 1. A one-way clutch C4 is arranged between the first-speed driven gear 36 and the countershaft 30, to permit transmission of engine torque only in a direction of causing rotation of driving wheels WL and WR of the vehicle. A third-speed driven gear 38 is freely fitted on the countershaft 30 and adapted to rotate in unison therewith when the third-speed clutch C3 becomes engaged. The reverse gears 25 and 35 engage with each other through an idle gear I.

Driving torque is transmitted from the final driving gear 32 to a final driven gear 40 engaging therewith, and then to the left and right driving wheels WL, WR through a differential gear 42 formed integrally with the final driven gear 40. Incidentally, to drive the vehicle in reverse, a selector sleeve 44 disposed around the countershaft 30 is shifted to the right as viewed in the figure, by means of a shift fork, not shown, to engage the countershaft 30 with the reverse driven gear 35, and at the same time the second-speed clutch C2 is engaged. Thus, engine torque is transmitted to the left and right driving wheels WL, WR to drive the vehicle in reverse.

FIG. 2 shows a control system for controlling the direct-coupling clutch Cd of the torque converter 10 appearing in FIG. 1. In the figure, of the clutches the first-speed and second-speed clutches alone are shown for convenience of explanation.

In FIG. 2, the oil hydraulic pump 50 for sucking oil from a tank 58 for pressure delivery of same is connected to ports 51b and 51c of a regulator valve 51 through a fluid line 70, and to an input port 53a of a manual shift valve 53 through a fluid line 72. The port 51c of the regulator valve 51 is connected through a fluid line 71 to an input port 52a of a governor valve 52 of a conventionally known type, which in turn has its output port 52b connected to an input port 54b of a pressure limiting valve 54 through a fluid line 73. A port 51e of the regulator valve 51, a port 52c of the governor valve 52, and ports 54d and 54e of the pressure limiting valve 54 are all connected to the tank 58. The regulator valve 51 has its output port 51d connected to a port 10a of the torque converter 10 through a fluid line 85 and a restriction 94.

The regulator valve 51 has a pair of pressure control springs 51f and a spring-receiving cylinder 51g supporting the outer ends of the springs 51f and axially movable for adjusting the combined setting load of the springs 51f. The cylinder 51g has an outer end face thereof disposed in urging contact with the stator arm 17a so that the reaction force acting upon the stator 16 is applied to the cylinder 51g. A stator spring 51h is disposed to urge the cylinder 51g against the reaction force of the stator 16. As the stator spring 51h is compressed with an increase in the reaction force of the stator 16, the cylinder 51g moves leftward as viewed in FIG. 2, to increase the combined setting load of the pressure control springs 51f, to thereby increase the line pressure in the fluid line 70.

An output port 53b of the manual shift valve 53 is connected to a port 55b of a shift valve 55 through a fluid line 74 and a restriction 91, as well as to the first-speed or low-speed clutch C1 through a fluid line 75 and a restriction 90. The shift valve 55 has its output port 55c connected to the second-speed or high-speed clutch C2 through a fluid line 76, and its ports 55d and 55e are connected to the tank 58.

An output port 54c of the pressure limiting valve 54 is connected to a port 55g of the shift valve 55 and an input port 56c of an electromagnetic valve 56 as a pilot valve through a fluid line 77, a restriction 92 and a fluid line 78. The electromagnetic valve 56 has its output port 56d connected to the tank 58.

The output port 51d of the regulator valve 51 is connected to a port 61b of a locking-up control valve 61 through a fluid line 79, a timing valve 59, a modulator valve 60 and a fluid line 80, as well as to a port 61c of the same valve 61 through a restriction 93. The timing valve 59 is connected at one end face 59a of a spool thereof to the fluid line 76 through a pilot fluid line 83, whereas the modulator valve 60 is connected at one or right end face 60a of a spool thereof to the fluid line 80 at a location downstream of the modulator valve 60 and upstream of the locking-up control valve 61, through a fluid line 84. The modulator valve 60 is connected at its other or left end face 60b of the spool to the output port 52b of the governor valve 52 through a pilot fluid line 82. Fluid lines 88 and 89 to which the timing valve 59 and the modulator valve 60 are connectible, respectively, are connected to the tank 58.

An electromagnetic valve 57 as another pilot valve has its input port 57c connected to a pressure chamber 61f of the locking-up control valve 61 through a fluid line 81, and has its output port 57d connected to the tank 58. An output port 61d of the locking-up control valve 61 is connected to the cylinder 7 of the direct-coupling clutch Cd through a fluid line 86 and a port 10b of the torque converter 10. The torque converter 10 has its port 10c connected to the tank 58 through a fluid line 87 and a check valve 62. Solenoids 56a and 57a of the electromagnetic valves 56, 57 are connected to an electronic control circuit 100.

Figure 3:
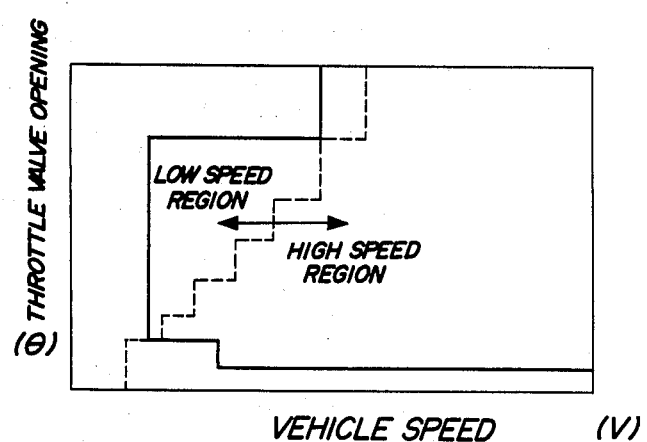
FIG. 3 is a graph showing, by way of example, a map of schedule for effecting locking-up of a hydraulic torque converter appearing in FIGS. 1 and 2.

A vehicle speed sensor 101 detects the speed of the automotive vehicle and supplies the electronic control circuit 100 with a signal indicative of the detected vehicle speed, for instance, a pulse signal having a pulse repetition period variable in response to the vehicle speed. A throttle valve opening sensor 102 is connected to a throttle valve, not shown, arranged in the intake passage of the engine 1, and supplies the electronic control circuit 100 with a signal indicative of the detected valve opening of the throttle valve. The electronic control circuit 100 stores therein a map of schedule for effecting locking-up of the torque converter 10, which is based upon the vehicle speed V and the throttle valve opening, as shown in FIG. 3. The electronic control circuit 100 operates on the signals supplied from the vehicle speed sensor 101 and the throttle valve opening sensor 102 to control the electromagnetic valve 56 for changing the speed reduction ratio and the electromagnetic valve 57 for effecting locking-up of the torque converter 10, in response to operating conditions of the engine. That is, the electronic control circuit 100 determines whether the engine is operating in a low speed region on the left side or in a high speed region on the right side with respect to a boundary indicated by the broken line in the map of FIG. 3. When the engine is operating in the left or low speed region, the electronic control circuit 100 supplies a driving signal to the electromagnetic valve 56 to energize same, whereas when the operating condition of the engine falls within the right or high speed region, the same electromagnetic valve 56 is deenergized.

The electronic control circuit 100 further determines whether the engine is operating in a left region or in a right region with respect to a boundary indicated by the solid line in the map of FIG. 3. When the engine is operating in the left region, the electronic control circuit 100 supplies a driving signal to the electromagnetic valve 57 to energize same, whereas when the operating condition of the engine falls within the rightward region, the electromagnetic valve 57 is deenergized. These electromagnetic valves 56, 57 are adapted to open when energized, and to close when deenergized.

Various means such as the vehicle speed sensor 101, the throttle valve opening sensor 102 and the electronic control circuit 100 may be of a known types, and therefore explanation thereof is omitted.

The control device for the direct-coupling clutch Cd constructed as above operates as follows: First, the oil hydraulic pump 50 sucks oil from the tank 58 and feeds pressurized oil into the fluid line 70. The pressurized oil from the pump 50 has its pressure regulated to a predetermined level or a predetermined line pressure value by the regulator valve 51.

Having been regulated to a predetermined pressure value by the regulator valve 51, the pressurized oil is supplied to the governor valve 52 and the manual shift valve 53. The governor valve 52 operates to supply output oil pressure corresponding to the vehicle speed, while the manual shift valve 53 operates to connect the oil hydraulic pump 50 with the fluid line 74 when it is shifted to a drive-range (D-range) position thereof, to engage the first-speed or low-speed clutch Cl, thereby establishing the first-speed reduction ratio.

Figure 4:
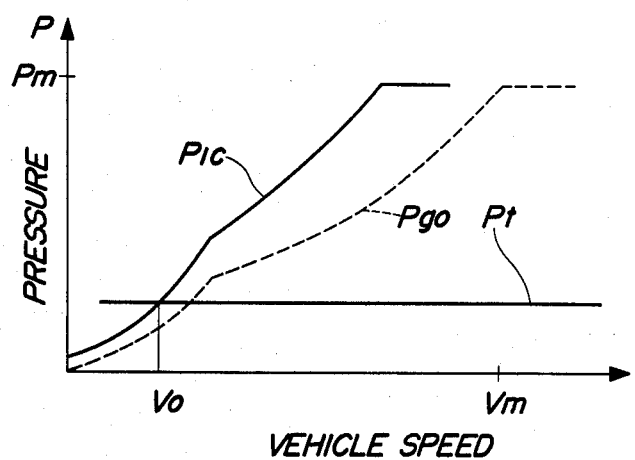
FIG. 4 is a graph showing output fluid pressure characteristics of a modulator valve and a governor valve appearing in FIG. 2.

The governor valve 52 is rotated at a speed proportional to the vehicle speed, to supply output oil pressure Pgo to the fluid line 73, which is proportional to the square of the vehicle speed due to centrifugal force produced therein, as indicated by the broken line in FIG. 4. The oil pressure Pgo has its maximum value regulated by the pressure limiting valve 54, and thereafter is introduced into a pressure chamber 55*f* of the shift valve 55 at its right end through the fluid line 77 and the restriction 92. The pressure limiting valve 54 may be of the most popular type, wherein the oil pressure Pgo acts upon a spool 54*a* at its right end face, and when the oil pressure Pgo exceeds a prescribed value Pm, the spool 54*a* is displaced by the same pressure to close the input port 54*b*, thus regulating the output oil pressure from the pressure limiting valve 54 to the prescribed value or less.

When the electromagnetic valve 56 is energized while the manual shift valve 53 is in the drive range position as mentioned above, its valve body 56*b* is magnetically attracted into the illustrated position to open the input port 56*c*, and accordingly the oil supplied to the electromagnetic valve 56 through the restriction 92 is all returned to the tank 58 through the output port 56*d*. As a consequence, no pressurized oil is introduced into the pressure chamber 55*f* of the shift valve 55 so that its spool 55*a* is biased to the rightmost position as viewed in FIG. 2, by the force of a spring 55*h* thereof. Thus, the shift valve 55 is in a closed position wherein the second-speed clutch C2 is not supplied with pressurized oil, while the first-speed clutch C1 then remains engaged as stated before, thereby allowing the auxiliary transmission 20 to maintain the first-speed or low-speed reduction ratio. In this manner is established the low-speed transmission system.

When the electromagnetic valve 56 is then deenergized to close the input port 56*c* with its valve body 56*b*, all of the oil supplied through the restriction 92 is introduced into the pressure chamber 55*f* of the shift valve 55. Then, the spool 55*a* is urgedly displaced leftward as viewed in FIG. 2 by the pressurized oil introduced into the pressure chamber 55*f* against the force of the spring 55*h*, to establish communication between the input port 55*b* and the output port 55*c* whereby the second-speed or high-speed clutch C2 is supplied with oil from the fluid line 74 through the restriction 91, the shift valve 55 and the fluid line 76, thereby causing engagement of the second-speed clutch C2. As stated before with reference to FIG. 1, the first-speed transmission system is provided with the one-way clutch C4, and by virtue of this clutch C4, the second-speed or high-speed reduction ratio can be established even with the first-speed clutch C1 kept in an engaged state. Therefore, the high-speed transmission system is established on this occasion.

As shown in FIG. 4, when the vehicle speed is above a prescribed valve Vm, the oil pressure present in the pressure chamber 55*f* of the shift valve 55 is equal to the maximum value Pm regulated by the pressure limiting valve 54, whereas when the vehicle speed is below the value Vm, the same oil pressure assumes a variable value equal to the output pressure Pgo of the governor valve 52. Therefore, the lower the vehicle speed is, the lower the oil pressure supplied to the pressure chamber 55*f* of the shift valve 55 becomes. Therefore, even when the electromagnetic valve 56 is open, the quantity or flow rate Q of oil drained to the tank 58 through the restriction 92 and the electromagnetic valve 56 decreases with a decrease in the vehicle speed, at a rate proportional to the square root of the output pressure Pgo of the governor valve 52. The governor pressure Pgo is proportional to the square of the vehicle speed, as stated before. Therefore, the quantity of loss of oil caused by its drainage through the restriction 92 and the electromagnetic valve 56 is proportional to the vehicle speed until the vehicle speed reaches the prescribed speed Vm, while it remains constant when the vehicle speed exceeds the same speed Vm.

Therefore, even when the vehicle speed is zero and the stator arm 17*a* urgingly displaces the valve body 51*a* of the regulator valve 51 leftward as viewed in FIG. 2, against the force of the spring, to cause the regulator valve 51 to increase the line pressure, such as immediately before the start of the vehicle, the drainage loss of pressurized oil can theoretically be reduced to zero.

The governor pressure Pgo from the governor valve 52 also serves to increase the engaging force of the direct-coupling clutch Cd in response to an increase in the vehicle speed. Part of the oil delivered from the regulator valve 51 into the fluid line 79 is supplied to the interior of the torque converter 10 through the fluid line 85, the restriction 94 and the port 10*a*, and after cooling the torque converter 10, it is returned to the tank 58 through the fluid line 87 and the check valve 62. On the other hand, the remaining part of the oil is supplied through the timing valve 59 which temporarily interrupts the locking-up of the torque converter 10 at changeover of the speed reduction ratio, and the modulator valve 60 which increases the engaging force of the direct-coupling clutch Cd with an increase in the vehicle speed, to the input port 61b of the locking-up control valve 61 as well as to the port 61c of the same valve through the restriction 93.

When the electromagnetic valve 57 is deenergized to close the port 57c the oil introduced into the pressure chamber 61f of the locking-up control valve 61 urges a spool 61a thereof to the left as viewed in the FIG. 2, against the force of a spring 61g thereof, to establish communication between the input port 61b and the output port 61d. Consequently, the pressurized oil in the fluid line 80 is introduced into the cylinder 7 of the direct-coupling clutch Cd through the locking-up control valve 61, the fluid line 86 and the port 10b of the torque converter 10, to thereby urge the driven member 5 against the driving member 3 to lock up the torque converter 10.

On the other hand, when the electromagnetic valve 57 is energized to open the port 57c, the oil introduced into the pressure chamber 61f of the locking-up control valve 61 is returned to the tank 58 through the electromagnetic valve 57, and accordingly the spool 61a of the locking-up control valve 61 is displaced to the right or to the illustrated position in FIG. 2, by the force of the spring 61g, to close the input port 61b. In this manner, the supply of pressurized oil to the cylinder 7 of the direct-coupling clutch Cd is interrupted to interrupt the locking-up of the torque converter 10. That is, when the electromagnetic valve 57 is energized, the locking-up control valve 61 is closed to interrupt the locking-up of the torque converter 10, whereas when the electromagnetic valve 57 is deenergized, the locking-up control valve 61 is opened to actuate the direct-coupling clutch Cd to lock up the torque converter 10. Since the electromagnetic valve 57 is energized only when the engine is operating in the left region with respect to the solid line in the map of FIG. 3, the period of time during which the electromagnetic valve 57 is energized will occupy a very small percentage of the running time of the vehicle.

When the pressurized oil is not supplied to the fluid line 76, that is, when the shift valve 55 is closed as shown in FIG. 2, and therefore the first-speed clutch C1 alone is engaged to establish the first-speed reduction ratio, the timing valve 59 is shifted to the illustrated position 59A in FIG. 2 by the force of a spring 59b thereof. On the other hand, when the electromagnetic valve 56 is closed to thereby open the shift valve 55 and accordingly the fluid line 76 is supplied with pressurized oil, the oil is supplied to the timing valve 59 through the pilot fluid line 83 to displace the spool of the timing valve 59 against the force of the spring 59b thereby switching the timing valve 59 to a position 59C by way of a fluid-supply interrupting position 59B. That is, as the second-speed clutch C2 becomes engaged, the timing valve 59 is first shifted to the position 59B to temporarily interrupt the supply of oil to the locking-up control valve 61, and thereafter when the engagement of the second-speed clutch C2 is completed, the timing valve 59 is further shifted to the position 59C. In this manner, the locking-up of the torque converter 10 is temporarily interrupted at changeover of the speed reduction ratio.

The modulator valve 60 serves to increase the pressure of operating fluid acting upon the cylinder 7 of the direct-coupling clutch Cd, in response to an increase in the vehicle speed. More specifically, the governor pressure Pgo from the governor valve 52 is supplied to the modulator valve 60 at the left end face 60b of its spool through the pilot fluid line 82, to urge the spool of the modulator valve 60, together with a spring 61c thereof, in a direction of shifting the spool to a position 60A, i.e. in the rightward direction as viewed in FIG. 2. As stated before, the spool of the modulator valve 60 has its right end face 60a acted upon by the oil pressure outputted from the modulator valve 60 per se, to urge the spool in a direction of shifting same to a position 60B, i.e. in the leftward direction as viewed in the figure, in a manner such that the oil pressure acting upon the right end face 60a of the spool counteracts the combined force of the governor pressure Pgo and the force of the spring 60c, acting upon the left end face 60b of the spool.

As the vehicle speed increases, the governor pressure Pgo increases as shown in FIG. 4, and the spool of the modulator valve 60 is correspondingly displaced rightward. As the spool of the modulator valve 60 is thus displaced rightward, the pressure of operating fluid outputted from the modulator valve 60 is increased to accordingly increase the urging force acting upon the right end face 60a of the spool, whereby the spool of the modulator valve 60 is displaced until the forces acting upon the opposite end faces 60a, 60b of the spool become equilibrated. In this manner, the oil pressure outputted from the modulator valve 60, i.e. the pressure of operating fluid Plc supplied to the direct-coupling clutch Cd, is varied in proportion to the vehicle speed, as indicated by the solid line in Fig. 4.

When the electromagnetic valve 57 is energized to open the port 57c as shown in FIG. 2, the oil introduced into the pressure chamber 61f of the locking-up control valve 61 through the fluid line 80 and the restriction 93 is returned to the tank 58 through the open electromagnetic valve 57, and accordingly the spool 61a of the locking-up control valve 61 is displaced to the right or illustrated position by the force of the spring to close the locking-up control valve 61.

The electronic control circuit 100 is adapted to energizes the electromagnetic valve 57 to interrupt the locking-up of the torque converter 10 when the engine is operating in a condition where locking-up of the torque converter 10 is not desirable, such as when the accelerator pedal is returned to the idle position while the vehicle is running, and when there occurs a drop in the vehicle speed while the high-speed reduction ratio is established, wherein the engine speed drops to cause so-called surging within the torque converter 10. That is, the electronic control circuit 100 operates to interrupt the locking-up of the torque converter 10 when the engine is operating in the leftward region in the map of FIG. 3.

When the vehicle is in a starting condition, the modulator valve 60 assumes the position 60B since the governor pressure Pgo is then low, and the pressure Plc of the operating fluid is also low, so that locking-up of the torque converter 10 will not be effected. However, to positively prohibit the locking-up of the torque converter 10 at the start of the vehicle, the electromagnetic valve 57 is kept energized to close the locking-up control valve 61 until the vehicle speed reaches a predetermined speed. Even while the torque converter 10 is thus released from its locking-up due to energization of the electromagnetic valve 57, although the operating fluid pressure dependent upon the governor pressure Pgo is supplied through the restriction 93 to the electromagnetic valve 57. Therefore, at the start of the vehicle, and at very low speed operating of the vehicle, the operating fluid is returned to the tank 58 through the valve 57. However, the amount of loss of the operating fluid is negligibly small by virtue of the operation of the modulator valve 60 of regulating the operating fluid pressure Plc to a low value, as well as by the restricting action of the restriction 93.

During locking-up of the torque converter 10, the electromagnetic valve 57 is in a closed position, as noted before. Therefore, there is then almost no loss of the operating fluid since the amount of the operating fluid returning to the tank 58 through the electromagnetic valve 57 is then substantially zero. Therefore, the operating fluid pressure regulated by the modulator valve 60 is transmitted to the locking-up servo mechanism without pressure loss, thereby imparting a required engaging force to the locked-up torque converter 10.

Even if the electromagnetic valve 57 is unexpectedly closed due to a trouble such as a wiring disconnection, the engaging force of the direct-coupling clutch Cd is decreased with a decrease in the vehicle speed, as shown in FIG. 4, and when the vehicle speed drops below a prescribed speed Vo, the internal pressure Pt of the torque converter 10 becomes higher than the operating fluid pressure Plc supplied to the direct-coupling clutch Cd, to interrupt the locking-up of the torque converter 10, thus avoiding engine stall upon stoppage of the vehicle.

Although in the illustrated embodiment the modulator valve 60 is arranged in the fluid line at a location between the timing valve 59 and the locking-up control valve 61, it may alternatively be arranged in the fluid line 79 at a location between the timing valve 59 and the junction of the fluid line 79 with the fluid line 85. Further alternatively, the modulator valve 60 may be arranged in the fluid line 86 at a location downstream of the locking-up control valve 61.

What is claimed is:

1. In an automotive vehicle having a hydraulic torque converter having an input member, an output member, and a hydraulic direct-coupling clutch arranged between said input and output members and being operable to mechanically engage said input and output members with each other, a control device for said hydraulic direct-coupling clutch, said control device comprising:
   a selector valve electrically actuatable for controlling the supply of operating fluid to said direct-coupling clutch,
   said selector valve having a valve body and a pressure chamber defined by one end face of said valve body;
   a pilot fluid pressure source for generatig pilot fluid pressure and supplying same to said pressure chamber to act upon said one end face of said valve body of said selector valve and operable to bias said valve body to a position for supplying said operating fluid to said direct-coupling clutch;
   a drain line communicating said pressure chamber of said selector valve with a zone under a lower pressure;
   an electromagnetic valve arranged across said drain line and adapted to open said drain line when energized, to permit said pilot fluid pressure in said pressure chamber of said selector valve to escape to said zone under a lower pressure;
   an electrical circuit adapted to supply said electromagnetic valve with electric power at least dependent upon the speed of said automotive vehicle, for energizing said electromagnetic valve;
   signal pressure generating means for generating signal fluid pressure dependent upon the speed of said automotive vehicle; and
   fluid pressure regulating means for regulating the magnitude of pressure of said operating fluid in response to said signal fluid pressure generated by said signal pressure generating means,
   said fluid pressure regulating means being adapted to regulate the pressure of said operating fluid to values smaller than a value at which said direct-coupling clutch is rendered operative, for rendering said direct-coupling clutch inoperative irrespective of the operative state of said electromagnetic valve, when the speed of said automotive vehicle is smaller than a predetermined value.

2. A control device as claimed in claim 1, including an operating fluid source for supplying said operating fluid, and an operating fluid line connecting said operating fluid source to said direct-coupling clutch by way of said selector valve, wherein said fluid pressure regulating means is arranged in said operating fluid line at a location between said operating fluid source and said selector valve, and wherein said pilot fluid pressure of said pilot fluid pressure source is fluid pressure generated by said fluid pressure regulating means.

3. A control device as claimed in claim 1 or claim 2, wherein said fluid pressure regulating means is adapted to increase the pressure of said operating fluid in proportion to an increase in the speed of said automotive vehicle.

4. A control device as claimed in claim 2, including a pilot fluid line branching off from said operating fluid line at a location between said selector valve and said fluid pressure regulating means and communicating with said pressure chamber of said selector valve, and restriction means arranged across said pilot fluid line.

* * * * *